No. 747,889. PATENTED DEC. 22, 1903.
J. F. McELROY.
ELECTRIC LIGHTING SYSTEM.
APPLICATION FILED OCT. 21, 1902.
NO MODEL.
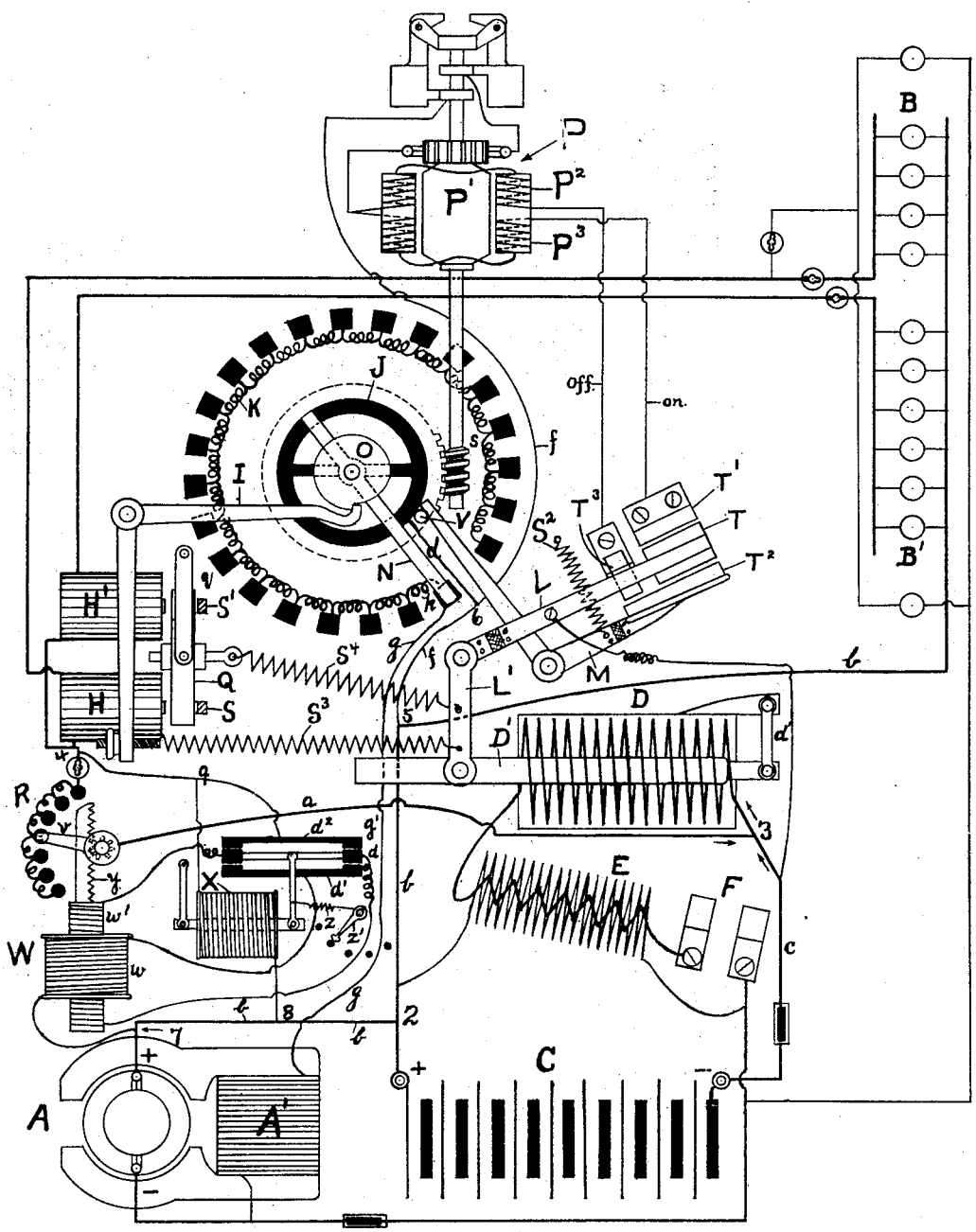

No. 747,889. Patented December 22, 1903.

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

ELECTRIC-LIGHTING SYSTEM.

SPECIFICATION forming part of Letters Patent No. 747,889, dated December 22, 1903.

Application filed October 21, 1902. Serial No. 128,137. (No model.)

*To all whom it may concern:*

Be it known that I, JAMES F. MCELROY, a citizen of the United States, residing at Albany, county of Albany, and State of New York, have invented certain new and useful Improvements in Electric-Lighting Systems, of which the following is a specification, that, in connection with the drawing, shows as an illustration that form of the invention which I now regard as the best out of the various forms in which the principle of the invention may be applied.

My invention relates to a system of electric lighting in which the generator is driven by the axle of a railway-vehicle or other motor characterized by an intermittent and variable speed and in which, moreover, a storage battery is provided which will be charged by the generator and utilized to operate the lamps when the generator is not running or is below its proper speed.

My present system is one in which the generator is preferably of a capacity adequate for the operation of the entire lamp load and the simultaneous charging of the battery even in its depleted condition. A system of this type obviates the necessity for a long day run devoted merely to the charging of the batteries as a necessary preliminary to a short night run in which the dynamo operates the lamp only and is assisted therein by such discharge from the battery (previously charged by the long run aforesaid) as may be required to supplement the deficiency of the dynamo under a large load and at the lower rates of speed.

My system has for its leading feature of novelty certain regulating devices for the generator to enable it to meet all the various conditions of service, and in particular I provide a regulation which is controlled by the volume of current generated, with certain supplementary features designed to modify such regulation in accordance with the requirements of the lamps under varying conditions.

In another application, Serial No. 126,012, filed October 6, 1902, I have shown and described an arrangement which is generic to the device of the present application in so far as it exhibits an arrangement wherein the lamps and battery are in separate multiple branches and the dynamo-regulator is controlled by a magnet which responds to the requirements of both branches, being shown as included in the unbranched portion of the circuit, while a modifying-coil for said magnet is included in series with one of the branches. In the present application I have particularly provided for a case wherein the modifying-magnet is in the lamp branch and is, moreover, composed of two separate magnets which are respectively included in series with the groups of lamps into which the entire number of lamps is divided. The modifying-magnet also acts to adjust the tension of the retracting-spring of the regulator-magnet.

Referring to the drawing, A represents a dynamo which is supposed to be driven by a car-axle or similar agency.

B and B' represent two groups of electric lamps which are to be supplied from the dynamo, and C is a storage battery to be charged by the machine simultaneously with its operation of the lamps. The main circuit from the dynamo starts from the positive brush and branches at the point 2, one branch going through the lamps and the other branch through the battery, with the two branches reunited at the point 3, whence the total current goes through the regulating-magnet D, thence through the cut-out magnet E, the main-circuit switch F, and back to the negative brush of the dynamo. The lamp branch aforesaid may be traced from the point 2 by the wire $b$ to the lamp groups B and B', thence by the magnets H and H', included, respectively, in series with the said lamp groups, to the point 4. From this point it passes through more or less of the resistance R and thence by the wire $a$ to the point 3, where, as aforesaid, it meets the battery branch. The battery branch may be traced from the point 2 to the battery C and thence to the point 3 by the wire $c$. It will be manifest that the entire current passes through the magnet D, and if the said magnet has complete control of the current output of the dynamo it will maintain such current constant in volume, setting in motion regulating agencies which will increase the current if it becomes smaller or decrease it if it becomes larger than the standard amount. Such in general is the function of the said magnet D; but a strictly constant or unchangeable amount of current would be unsuitable for the lamps and battery which properly require when supplied simultaneously by the dynamo a more or less changeable amount of current, particularly the lamps which are changeable in number, while owing to the varying degree of counter electromotive force in the battery it would necessarily draw at times more than its quota of the prescribed current if the total amount of such current were unchangeable.

I will first describe the means by which the magnet D controls the output of the generator and will then describe the means by which such control is modified.

The dynamo A is of the shunt type—that is to say, the coil which energizes its field-magnet is contained in a shunt or branch circuit passing directly from one brush of the dynamo to the other, with only the inclusion therein of the artificial resistance required for regulating the current flow therethrough, which as a consequence determines the strength of the field-magnet of the dynamo upon which the output of the dynamo depends, being greater as the field-magnet becomes stronger and less as the field-magnet becomes weaker. This field-magnet circuit starts from the point 5 on the positive wire $b$ and goes thence to point 6 on the wire $f$, from which it goes by the wire $d$ to the contact-ring J, upon which bears the arm N of the rheostat K. From this arm it goes through more or less of the resistance of the rheostat, dependent upon the position of the arm N, or if the apparatus is in its "off" position, with the arm resting on the final plate $k$ of the rheostat, the circuit passes from said plate $k$ by the wire $g$ to field-magnet coil A' of the dynamo and thence to the negative brush.

In order that the magnet D may control the position of the rheostat-arm N and in consequence the amount of resistance in the field-magnet circuit, upon which, as aforesaid, the strength of the field-magnet and the current output of the dynamo depend, I provide that the said magnet shall immediately control the motor P, which in turn operates the rheostat-arm by a worm-wheel and screw $s$ or other suitable mechanical transmitter. To this end the said motor is included in a shunt-circuit, which passes first through the armature P' of the motor and then branches through two oppositely-wound field-magnet coils $P^2$ and $P^3$. The said circuit may be closed through one of these field-magnet coils or the other, and thereby give the motor either a forward or a reverse direction of rotation. The closing of the motor-circuit is effected immediately by the said magnet D, which leaves the said circuit open so long as the current in its own coils is of the standard value, but closes it through the field-magnet $P^3$ when such current becomes too great or through the field-magnet $P^2$ when such current becomes too small. Since the former field-magnet gives the motor P a direction of rotation which will turn the rheostat-arm in the "on" direction, so as to include more of the resistance K in the field-magnet circuit of the dynamo to weaken it, and since the latter field-magnet coil will give the said motor the opposite direction of rotation, the magnet D, which always measures the main current, is enabled to increase or decrease the output of the dynamo to correct any departure thereof from the standard which it sets.

The details of the mechanism by which the magnet D controls, as aforesaid, the circuit of the rheostat-motor P are as follows: D' is the core of the magnet D, (which is of the solenoid type,) which core is suspended horizontally by the link $d'$ at one end and at the other end by the lever-arm L', rigidly connected to the lever-arm L, which latter carries at its outer extremity the contact-block T, vibrating between the stationary contact T' on one side and the contact $T^2$ on the other side. When the current in the coil of magnet D is normal, the core D' stands in the median position and holds the contact-block T midway between the contacts T' and $T^2$ and out of connection with either. The field-magnet coil $P^3$ of rheostat-motor P is connected to the aforesaid contact T' and the field-magnet coil $P^2$ is connected to the opposite contact $T^2$ through an intermediate contact $T^3$, which is normally closed when the apparatus is in operation, but is opened when it comes to rest in its off condition. The purpose of the supplementary contact $T^3$ is to prevent the circuit of the motor from remaining closed when the apparatus is not in use and when by reason of the absence of any current in the magnet D the contact T will rest against the contact $T^2$ and would hold the motor-circuit closed were it not for the break in the circuit at the point $T^3$. Such maintained closure of the motor-circuit would be objectionable, since, as may be particularly noted, the motor is operated from the storage battery and would drain away the charge from the battery if its circuit were left closed when not in active use. The said contact $T^3$ is disconnected from the contact $T^2$ by having the latter mounted upon one arm of elbow-lever M, the other arm of which is struck by a pin V when the apparatus comes to rest and the contact $T^2$ thereby moved away from contact $T^3$ against the force of the operating-spring $S^2$. When, however, the apparatus starts, the pin V moves out of contact with the said lever-arm and allows the spring $S^2$ to bring the contact $T^2$ into engagement with said contact $T^3$ to close the motor-circuit at that point and leave it entirely under the control of the contact-block T, which in the manner above described acts to close the motor-circuit through one field-magnet coil or the other upon any departure from the normal amount of current determined by the governing-magnet D.

In order to adjust the action of the governing-magnet D and cause it to respond to the required current, I provide means for regulating its retracting-spring, against the force of which the power of the magnet is exerted. Of course if the retracting-spring is made stronger the magnet will require a greater current to draw its core D' into a definite position against the force of the said springs.

There are two retracting-springs $S^3$ and $S^4$, both attached at one end to the lever-arm L', while at their rear ends the spring $S^3$ is attached to one end of an angle-lever I, the opposite arm of which bears upon a cam O on the shaft of the rheostat, and the spring $S^4$ is attached to the armature Q of the two opposition magnets H and H'. The spring $S^4$ does not come into action when all the lamps are turned off. In that event it is the spring $S^3$ only which acts against the magnet and causes it to respond to the particular amount of current required for the storage battery, such current being practically constant in amount, although when the apparatus starts into action by the closure of the main switch F at a certain low speed of the train—say fifteen miles per hour—the speed is liable to be increasing at that time. Hence the spring $S^3$ is left somewhat slack, so as to respond to a somewhat smaller current than would be normally demanded in anticipation, so to speak, of a rise of the current to its usual normal amount. The response of the magnet D to a smaller current starts the rheostat-motor P in the manner aforesaid and causes it to introduce resistance K into the field-magnet circuit to prevent the rise of current from the machine under the increasing speed. At the same time the cam O acts immediately upon the lever P to give the spring $S^3$ its normal tension, and thereafter the magnet T will maintain a normal amount of current in the storage-battery circuit, any tendency to an increase or decrease above or below the normal being immediately checked by the introduction into or withdrawal from the field-magnet circuit of the resistance K. It will be understood that the closure of the main switch F is determined automatically in a manner well known to the art by a compound magnet E, containing a shunt-coil measuring the potential of the dynamo and operating to close the switch when that potential (dependent upon the speed) reaches a specified value. Upon the closure of the switch the main current from the dynamo passes also through a series coil upon the magnet E and retains the switch closed. If the speed of the dynamo drops, the current in the series coil of the magnet E decreases until the reverse-current from the battery flows therein, which neutralizes the retaining effect of the shunt-coil and opens the switch. This action need not be further described; but it may be noted that the pressure or potential of the dynamo which causes the shunt-coil magnet E to act is preferably greater than the pressure or potential which the storage battery will have when it is fully charged, being, in fact, of a value adequate to cause a flow of dynamo-current through the battery of an amperage which will cause the magnet D to respond prior to the readjustment of the spring $S^3$. If the lamps, as well as the battery, are in circuit, a greater amount of current will be required. Hence at this time the retractile force of the spring $S^4$ is added to that of the spring $S^3$ by the action of one or both of the magnets H and H', which act upon the armature Q, to which the rear end of the spring $S^4$ is attached. This function of the magnets H and H' may be indicated by the designation of them as "opposition" magnets, a term already used—that is, they act in opposition to the regulator-magnet D, serving to decrease its effect per ampere of current as the lamp-current increases—that is to say, inversely, as the change in lamp-current. If only the group of lamps B is in circuit, then the current flowing thereto will pass through the magnet H, the magnet H' remaining unenergized. This will cause the magnet H to draw upon the lower end of the armature Q, which is hung from its middle point by the link q. The upper end of the armature will, however, bear against the back-stop S', so that a certain degree of tension will be imposed upon the spring $S^4$, which tension will be doubled if the magnet H' is also energized, (by reason of the closure of the circuit through the group of lamps B',) which will attract the upper end of the armature Q, and because of the attraction of both ends of the armature the full amount of added tension will be imposed upon the spring $S^4$. If the magnet H' alone is energized, it will draw upon the upper end of the armature Q, while the lower end will remain against the back-stop S. This will provide for a change in the total volume of current proportionate (a) to the battery alone or (b) to the battery plus lamps B or (c) to the battery plus lamp groups B and B'. In either case, however, the amount of current for which the magnet D is adjusted will divide itself between the lamps and battery in inverse ratio to their respective resistances. To adjust the division of the current between the lamps and the battery, I employ a resistance R in the lamp-circuit, the value of which is such as to maintain in the lamps connected to the circuit at any given moment an amount of current equal to a given electromotive force divided by the lamp resistance. If the battery resistance increases, there will be a corresponding increase in the resistance R, that will prevent an excessive current in the lamp branch, while if the battery resistance decreases there will be a corresponding decrease in the resistance R, which will prevent any robbery of the lamps by the battery.

The mechanism for operating resistance R is as follows: A motor W (indicated by a solenoid $w$, acting as a field-magnet, and containing a second solenoid $w'$, acting as an armature) has its action controlled by the magnet X in shunt with the electric lamps, while the motor itself controls the resistance R. The operating-arm $r$ of the resistance is shown as rotated by a pinion on its shaft engaging a rack $y$, attached to the armature $w'$. A current-director operated by the solenoid X serves to send the current through the armature W in one direction or the other with respect to the current in the field-magnet $w$, which remains constant in direction. The circuit of the motor W is in shunt to the dynamo A, and the shunt-solenoid X is connected directly across the lamp-mains upon the lamp side of the resistance R, so as to respond to the lamp-potential and not to the potential on the opposite side of the resistance R. To trace the circuit of motor W, we may start at the point 7 on the wire $b$, connected to the positive brush of the dynamo. Thence it passes through the field-magnet solenoid $w$ to the lower limb $d'$ of the director, thence through the armature-solenoid $w'$ in one direction or the other, according to the position of the core of the solenoid X, and then to the upper limb $d^2$ of the director. From thence it goes to the point 4, which is connected to the negative side of the lamp-circuit, whereas the wire $b$ leads to the positive side of the said lamp-circuit. Again, the circuit of solenoid X is parallel to the circuit just described, starting from the wire $b$ at the point 8 and connecting at the point 9 with the wire leading from the director-limb $d^2$ to the point 4. In operation the magnet X so long as the potential at the lamps remains normal will hold its armature in a position to maintain the circuit of the motor W open at the director, while any departure up or down from such normal potential will set in action the motor W to increase or decrease the resistance R. For example, as the counter electromotive force of the battery increases as its charge increases it would cause a corresponding rise in the pressure of the lamps and a corresponding increase of current—that is to say, the increase in battery resistance would tend to divert a greater portion of the fixed amount of current through the lamps. This would, however, cause at the same time an increase of pressure upon the potential magnet X, which would set in operation the agencies just described to increase the resistance R correspondingly to the increase in the counter electromotive force of the battery. In this manner the ratio of division of the current between lamps and battery would remain unchanged. The reverse operation would take place if the battery becomes more or less exhausted and its counter electromotive force decreases. Of course the electromotive force or potential of the dynamo is changed by the readjustment of the distribution to meet a higher battery-voltage. A spring Z serves to retract the core of the magnet X, and the tension of this spring is indicated as adjustable by the pointer-arm $Z'$, the movement of which serves to wind up the cord or wire to which the spring C is anchored at its outer end. This affords an agency for adjusting the brilliancy of the lamps and, if desired, materially dimming them—as, for instance, in a sleeping-car at night. It may also be noted that the described maintenance of the ratio of division of current between lamps and battery will be effected in the same way if there are changes in resistance of the lamps due to the addition or subtraction of individual lamps from one or both groups instead of a change in the resistance of the battery branch. In any event the division of the current will depend on the relation of the counter electromotive force of the battery to the applied electromotive force on the lamps. I also desire to have it known that the remaining part of the apparatus herein shown outside of the particular matter claimed herein forms the subject-matter of other applications for patent heretofore made by me.

What I claim as new, and desire to secure by Letters Patent, is—

1. The combination with a variable-speed dynamo, of a series-regulator magnet therefor, lamps in groups, a storage battery in multiple with the lamps, adjusting devices for the said regulator controlled by the said lamp groups respectively to decrease the effect of the regulator with respect to the current dominating it, upon the connection of the respective lamp groups to the circuit.

2. The combination with a variable-speed dynamo of lamps in separate circuits and a storage battery in multiple with the lamps, a regulator and a series of adjusting-magnets for said regulator included in separate lamp-circuits respectively.

3. The combination in an electric-lighting system, of a variable-speed dynamo, lamps and a storage battery in separate multiple arc branches respectively, the lamps being divided into groups, a regulator for the dynamo, a magnet governing the regulator, and a coil in circuit with each of the respective lamp groups for modifying the regulation.

4. The combination with a dynamo, of electric lamps and a storage battery in separate multiple arc branches—the lamps being divided into groups—a regulator for the dynamo, a magnet-coil for said regulator responding to the requirements of both branch circuits, a magnet-coil in circuit with each group of lamps, and a retracting-spring for the regulating-magnet controlled by the said magnet-coils in the respective lamp-circuits.

5. The combination with electric lamps and a storage battery in multiple, of a dynamo charging the battery and operating the lamps at the same time, a regulator for the dynamo, a magnet controlling the regulator, a retracting-spring therefor and a magnet on the lamp branch of the circuit connected to the said spring to adjust its tension.

6. The combination with electric lamps and a storage battery in multiple, of a dynamo charging the battery and operating the lamps at the same time, a regulator for the dynamo, a magnet for said regulator carrying both the lamp and battery current, a retracting-spring for said magnet and an opposition magnet for adjusting said spring in direct ratio to the changes in lamp-current.

7. The combination with electric lamps in groups, a storage battery in multiple therewith, a dynamo, a regulator therefor, a magnet for the regulator and magnets in each of the respective lamp groups adjusting the regulator-magnet both individually and jointly.

8. The combination with a regulator of a magnet therefor a retracting-spring, an adjusting-armature for said spring centrally pivoted and also movable bodily, magnets for each end of said armature and back-stop corresponding to the respective magnets.

9. The combination with two magnets of a device operated thereby in successive steps, means for exciting the magnets in succession, a common armature for the magnets and a support for the armature pivoted thereto and pivotally upheld.

In witness whereof I have hereunto set my hand, this 16th day of October, 1902, before two subscribing witnesses.

JAMES F. McELROY.

Witnesses:
    ERNEST D. JANSEN,
    WILLIAM A. MORRILL, Jr.